(12) United States Patent
Numata

(10) Patent No.: US 8,050,154 B2
(45) Date of Patent: Nov. 1, 2011

(54) DRIVE CONTROL APPARATUS, DRIVE CONTROL METHOD AND OPTICAL PICKUP APPARATUS

(75) Inventor: Tomiyuki Numata, Mihara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 232 days.

(21) Appl. No.: 12/464,750

(22) Filed: May 12, 2009

(65) Prior Publication Data

US 2009/0296543 A1    Dec. 3, 2009

(30) Foreign Application Priority Data

May 29, 2008    (JP) ................... 2008-141579

(51) Int. Cl.
*G11B 7/00*    (2006.01)
(52) U.S. Cl. ................ 369/44.32; 369/53.12; 369/53.42
(58) Field of Classification Search ............... 369/44.11, 369/44.32, 53.12, 53.42
See application file for complete search history.

(56) References Cited

U.S. PATENT DOCUMENTS

| 6,249,495 | B1* | 6/2001 | Okada et al. ............... 369/44.28 |
| 2006/0143637 | A1 | 6/2006 | Torii |
| 2007/0206460 | A1* | 9/2007 | Ono et al. .................. 369/44.32 |
| 2007/0241716 | A1 | 10/2007 | Kubo et al. |
| 2009/0109819 | A1* | 4/2009 | Hosoda et al. ............. 369/53.17 |

FOREIGN PATENT DOCUMENTS

| JP | 2004-199780 | 7/2004 |
| JP | 2005-302118 | 10/2005 |
| JP | 2006-155839 | 6/2006 |
| JP | 2007-257720 | 10/2007 |

* cited by examiner

*Primary Examiner* — Wayne Young
*Assistant Examiner* — Brenda Bernardi
(74) *Attorney, Agent, or Firm* — Morrison & Foerster LLP

(57) ABSTRACT

A control unit is caused to drive a collimator lens from a position of an origin, by a clock number A of drive pulses of a pulse rate T1, thereby to move the collimator lens, and is caused to return the lens to the position of the origin at a pulse rate T2 higher than the pulse rate T1, and counts a clock number B of drive pulses required for returning the lens, and repeats the counting while raising the rate T2 stage by stage, until the clock numbers A and B do not become equal. When the clock numbers A and B are not equal, the control unit judges the occurrence of the step-out, and determines the rate T2 being one stage lower than the rate T2 at which the occurrence of the step-out has been judged, as the pulse rate of the operation of correction of spherical aberration.

16 Claims, 6 Drawing Sheets

DRIVE CONTROL APPARATUS, DRIVE CONTROL METHOD AND OPTICAL PICKUP APPARATUS

CROSS-REFERENCE TO RELATED APPLICATION

This application claims priority to Japanese Patent Application No. 2008-141579, which was filed on May 29, 2008, the contents of which are incorporated herein by reference in its entirety.

BACKGROUND OF THE INVENTION

1. Field of the Invention

The present invention relates to a drive control apparatus, a drive control method and an optical pickup apparatus in which drive of a motor is controlled. More particularly, the invention relates to a drive control apparatus and a drive control method which control the drive of a motor for moving a lens within an optical pickup apparatus that records or reproduces information on or from an optical disc by employing a semiconductor laser, and to the optical pickup apparatus.

2. Description of the Related Art

An optical disc apparatus has heretofore been known as an apparatus which is capable of recording and reproducing information of large capacities. An optical pickup apparatus which records and reproduces the information in the optical disc apparatus includes a semiconductor laser as a light source.

The optical disc apparatus records and reproduces the information by projecting a laser beam emitted from the semiconductor laser, onto an optical disc. In a reproduction mode, the optical pickup apparatus condenses the laser beam of predetermined power onto the optical disc and detects pits recorded on the optical disc, thereby to read the information recorded on the optical disc. In a recording mode, the optical pickup apparatus causes the semiconductor laser to emit light at power being higher than in the reproduction mode and modulates the laser power in accordance with the information to-be-recorded, thereby to form pits on the optical disc.

In order to record or reproduce the information at a high quality, the spherical aberration of an optical spot which is projected onto the optical disc needs to be corrected. An objective lens of a high numerical aperture, for example, a numerical aperture of 0.85 is employed especially for the optical disc called "Blu-ray Disc (hereinbelow, abbreviated to "BD"). Therefore, the allowable value of the thickness error of the protective layer of the optical disc is as strict as several μm or so, and the optical pickup apparatus (hereinbelow, also referred to as "optical pickup") is required to have the function of correcting the spherical aberration.

A collimator lens is an optical component for converting divergent light emitted from the laser element, into a collimated beam. In this regard, there is, for example, a method of correcting the spherical aberration of the objective lens by moving the collimator lens in the direction of the optic axis thereof, and for example, a stepping motor is employed for the movement of the collimator lens.

A technique for correcting the spherical aberration and a technique for driving the stepping motor as stated above have hitherto been proposed. By way of example, an optical pickup apparatus disclosed in Japanese Unexamined Patent Publication JP-A 2005-302118 moves the collimator lens by a piezoelectric actuator in which piezoelectric ceramics are stacked.

An optical disc apparatus disclosed in Japanese Unexamined Patent Publication JP-A 2007-257720 detects the step-out of the stepping motor for moving the optical pickup in the radial direction of the optical disc, and it lowers the rotational speed of the stepping motor in a case where the step-out has occurred. The "step-out" is the phenomenon that, in such a case where a pulse frequency specified to the stepping motor has heightened, the torque of the stepping motor becomes insufficient, so the stepping motor does not rotate in accordance with a pulse voltage specified. This optical disc apparatus decides the occurrence of the step-out when a stepper pointer which indicates the rotation magnitude of the stepping motor has exceeded its upper limit, or when an address indicated by the stepper pointer and an actual address are different. The actual address is obtained in such a way that a reproduction signal from the optical pickup is decoded by a decoder.

According to a lens drive device for an optical pickup as is disclosed in Japanese Unexamined Patent Publication JP-A 2004-199780, the speed of the stepping motor is properly set in accordance with the ambient temperature of the stepping motor, in order to prevent the step-out ascribable to the fact that the viscous resistance of oil becomes high under a low-temperature environment. By way of example, the rotational speed of the stepping motor is lowered at a low temperature.

A drive apparatus for the optical pickup as is disclosed in Japanese Unexamined Patent Publication JP-A 2006-155839 corrects the spherical aberration of the optical pickup apparatus by moving the collimator lens. A support member which supports the collimator lens and which is urged by a coiled spring, has its movement distance from a reference position controlled by a nut member which is moved by the stepping motor. In a range up to the reference position after the abutment of the support member against a stopper portion, the nut member and the support member are in a non-contact state. When the nut member has abutted against the stopper portion, the stepping motor steps out, and the nut member stops at the reference position, so that the reference position can be determined. On this occasion, the support member for supporting the collimator lens is out of contact with the nut member. It is therefore possible to avoid a shock and a vibration on any optical component attributed to the step-out, and to lighten a load on the stepping motor.

It is desired in correction of spherical aberration of the objective lens to move the collimator lens at a high precision, to move the collimator lens at a high speed or to realize the correction at low price and at low power consumption.

Regarding these points, the optical pickup apparatus disclosed in JP-A 2005-302118 moves the collimator lens by employing the piezoelectric actuator. The piezoelectric actuator is easily applicable in case of a small movement magnitude. In case of a large movement magnitude, however, the piezoelectric actuator needs to be controlled by disposing a position sensor for obtaining positional information over the whole movement range. Further, since the piezoelectric actuator is expensive as compared with the stepping motor, the optical pickup apparatus has the problem that it is difficult of realization with small size and at low price.

The optical disc apparatus disclosed in JP-A 2007-257720 detects the step-out of the stepping motor. However, the address information of the optical disc needs to be obtained by decoding a reproduction signal with a decoder, and this gives rise to the problem that the optical disc apparatus cannot be made small in size. The stepping motor of this optical disc apparatus is used for moving the optical pickup itself, and it does not move the collimator lens in order to correct the spherical aberration. Further, the rotational speed can be lowered at the detection of the step-out, but there is the problem that the step-out cannot be prevented.

The lens drive device for the optical pickup as is disclosed in JP-A 2004-199780 can prevent the step-out ascribable to the fact that the viscous resistance of the oil becomes high under the low-temperature environment. However, in the same manner as in the optical disc apparatus disclosed in JP-A 2007-257720, the stepping motor of the lens drive device is used for moving the optical pickup itself, and it is not directed to moving the collimator lens for the purpose of correction of spherical aberration. Accordingly, there is the problem that the step-out of the collimator lens cannot be prevented.

The drive apparatus for the optical pickup as is disclosed in JP-A 2006-155839 grasps the reference position based on the step-out of the stepping motor, and it has the problem that the step-out cannot be avoided.

SUMMARY OF THE INVENTION

An object of the invention is to provide a drive control apparatus and an optical pickup apparatus of small size and a drive control method, capable of avoiding step-out of a stepping motor in correcting a spherical aberration with low cost.

The invention provides a drive control apparatus comprising:

a movement speed variation unit for specifying varied movement speeds for a drive portion which drives a movement mechanism for moving an optical component, at a specified speed;

a step-out detection unit for detecting a movement speed at which the drive portion has stepped out, from among the varied movement speeds specified to the drive portion by the movement speed variation unit; and a determination unit for determining a movement speed for correction of spherical aberration due to movement of the optical component, based on the movement speed detected by the step-out detection unit.

According to the invention, a movement speed variation unit specifies varied movement speeds for a drive portion which drives a movement mechanism for moving an optical component, at a prescribed speed, a step-out detection unit detects a movement speed at which the drive portion has stepped out, from among the varied movement speeds specified to the drive portion by the movement speed variation unit; and a determination unit determines a movement speed for correction of spherical aberration due to movement of the optical component, based on the movement speed detected by the step-out detection unit.

More specifically, the movement speed at which the drive portion steps out can be detected beforehand without employing a piezoelectric element and a decoder which are expensive, and the movement speed at which the drive portion does not step out can be determined on the basis of the detected movement speed. Accordingly, the step-out of the drive portion such as a stepping motor can be avoided in correcting a spherical aberration with small size and at low price.

Furthermore, the invention provides a drive control apparatus comprising:

a drive voltage variation unit for specifying varied drive voltages for a drive portion which drives a movement mechanism for moving an optical component, at a drive torque according to a specified drive voltage;

a step-out detection unit for detecting a drive voltage at which the drive portion has stepped out, from among the varied drive voltages specified to the drive portion by the drive voltage variation unit; and a determination unit for determining a drive voltage for correction of spherical aberration due to movement of the optical component, based on the drive voltage detected by the step-out detection unit.

According to the invention, a drive voltage variation unit specifies varied drive voltages for a drive portion which drives a movement mechanism for moving an optical component, at a drive torque according to a specified drive voltage, a step-out detection unit detects a drive voltage at which the drive portion has stepped out, from among the varied drive voltages specified to the drive portion by the drive voltage variation unit, and a determination unit determines a drive voltage for correction of spherical aberration due to movement of the optical component, based on the drive voltage detected by the step-out detection unit.

More specifically, the drive voltage at which the drive portion steps out can be detected beforehand without employing a piezoelectric element and a decoder which are expensive, and the drive voltage at which the drive portion does not step out can be determined based on the detected drive voltage. Accordingly, the step-out of the drive portion such as a stepping motor can be avoided in correcting a spherical aberration with a small size and at a low price.

Furthermore, the invention provides a drive control method of controlling a drive portion that drives a movement mechanism for moving an optical component, at a movement speed specified, comprising:

a movement speed variation step of specifying varied movement speeds for the drive portion;

a step-out detection step of detecting a movement speed at which the drive portion has stepped out, from among varied movement speeds specified to the drive portion at the movement speed variation step; and a determination step of determining a movement speed for correction of spherical aberration due to movement of the optical component, based on the movement speed detected at the step-out detection step.

According to the invention, in controlling a drive portion which drives a movement mechanism for moving an optical component, at a specified movement speed, at a movement speed variation step, varied movement speeds are specified to the drive portion. At a step-out detection step, a movement speed at which the drive portion has stepped out, is detected from among varied movement speeds specified to the drive portion at the movement speed variation step. At a determination step, a movement speed for correction of spherical aberration due to movement of the optical component is determined, based on the movement speed detected at the step-out detection step.

More specifically, the movement speed at which the drive portion steps out can be detected beforehand without employing a piezoelectric element and a decoder which are expensive, and the movement speed at which the drive portion does not step out can be determined based on the detected movement speed. Accordingly, when the drive control method according to the invention is applied, the step-out of the drive portion such as a stepping motor can be avoided in correcting a spherical aberration with small size and at low price.

Furthermore, the invention provides a drive control method of controlling a drive portion that drives a movement mecha nism for moving an optical component, by a drive torque corresponding to a specified drive voltage, comprising:

a drive voltage variation step of specifying varied drive voltages to a drive portion;

a step-out detection step of detecting a drive voltage at which the drive portion has stepped out, from among the varied drive voltages specified to the drive portion at the drive voltage variation step; and a determination step of determining a drive voltage for correction of spherical aberration due to movement of the optical component, based on the drive voltage detected at the step-out detection step.

According to the invention, in controlling the drive portion by which the movement mechanism for moving the optical component is driven at a drive torque corresponding to a specified voltage, at a drive voltage variation step, varied drive voltages are specified to a drive portion. At a step-out detection step, a drive voltage at which the drive portion has stepped out is detected from among the varied drive voltages specified to the drive portion at the drive voltage variation step. At a determination step, a drive voltage for correction of spherical aberration due to movement of the optical component is determined, based on the drive voltage detected at the step-out detection step.

More specifically, the drive voltage at which the drive portion steps out can be detected beforehand without employing a piezoelectric element and a decoder which are expensive, and the drive voltage at which the drive portion does not step out can be determined based on the detected drive voltage. Accordingly, when the drive control method according to the invention is applied, the step-out of the drive portion such as a stepping motor can be avoided in correcting a spherical aberration with a small size and at a low price.

Furthermore, the invention provides an optical pickup apparatus comprising the drive control apparatus stated above.

According to the invention, an optical pickup apparatus comprises the drive control apparatus stated above, and hence, the step-out of the drive portion can be avoided.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
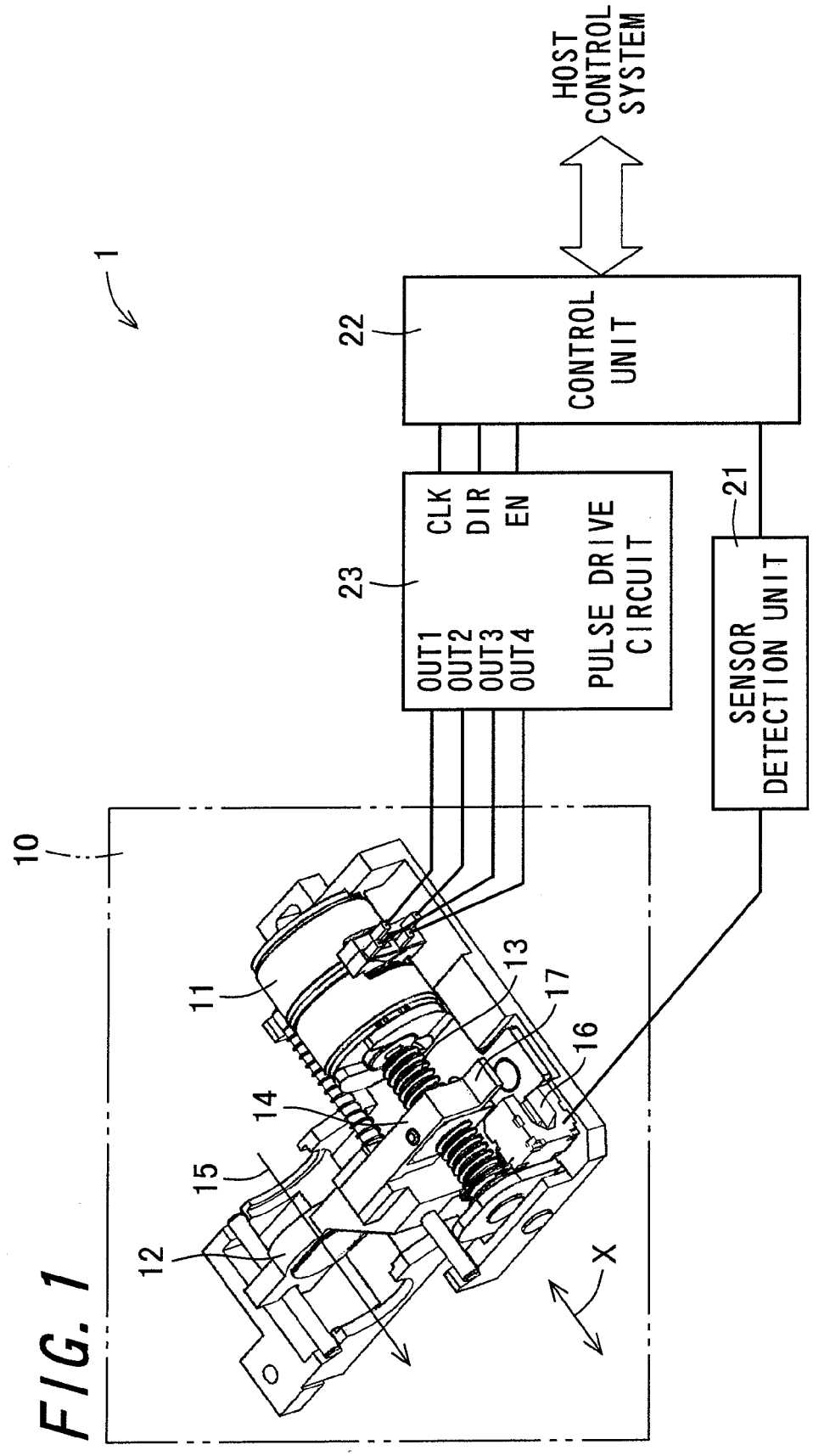
FIG. 1 is a block diagram schematically showing part of the configuration of an optical pickup apparatus according to one embodiment of the present invention.

Now referring to the drawings, preferred embodiments of the invention will be described in detail.

FIG. 1 is a block diagram schematically showing part of the configuration of an optical pickup apparatus 1 according to one embodiment of the present invention. The optical pickup apparatus 1 includes an optical pickup drive device 10, a sensor detection unit 21, a control unit 22 and a pulse drive circuit 23. The optical pickup drive device 10 includes a stepping motor 11, a collimator lens 12, a lead screw 13, a nut member 14 and a sensor 16.

A drive control apparatus according to one embodiment of the invention includes the sensor 16, the sensor detection unit 21, the control unit 22 and the pulse drive circuit 23. A drive control method according to the invention is processed by the drive control apparatus.

The stepping motor 11 serving as a drive portion is a motor which rotates the lead screw 13, and it rotates the lead screw 13 at a rotational speed corresponding to drive pulses to be stated later as are specified by the pulse drive circuit 23. The collimator lens 12 serving as an optical component is a lens which is supported by the nut member 14, and by which light emitted from a light source is turned into a collimated beam. This collimator lens 12 is moved in the direction of an X-axis in order to correct a spherical aberration which is ascribable to the error of the layer thickness of an optical recording medium such as an optical disc.

The lead screw 13 is rotated by the stepping motor 11, and it moves the nut member 14 forward and backward in the X-axial direction, depending upon the direction of the rotation. The nut member 14 supports the collimator lens 12 and is in engagement with the lead screw 13, and it moves the collimator lens 12 in the direction of the optic axis of the laser beam 15 or in a direction opposite to the direction of the optic axis, with the rotation of the lead screw 13. Further, the nut member 14 is provided with a light shield plate 17 on a side opposite to a support portion for supporting the collimator lens 12, with respect to the lead screw 13. The lead screw 13 and the nut member 14 constitute a movement mechanism.

The laser beam 15 is slightly shifted into a divergent beam or a convergent beam by the movement of the collimator lens 12, and the spherical aberration is changed and corrected by the shift. The movement range of the collimator lens 12 is, in general, on the order of several mm, depending upon the designs of the individual optical pickup apparatuses 1.

The sensor 16 is configured of, for example, a photointerrupter, and it is used for detecting the position of the collimator lens 12. With the sensor 16, the output current of the photointerrupter changes when, owing to the movement of the nut member 14, the light shield plate 17 provided in the nut member 14 has been inserted into the slot of the photointerrupter, thereby to intercept the light. The output current of the photointerrupter is sent to the sensor detection unit 21. The sensor detection unit 21 converts the output current from the sensor 16, into a binary signal, which is sent to the control unit 22 as a detection signal.

The control unit 22 serving as a determination unit includes, for example, a central processing unit (hereinbelow, referred to as "CPU") and a semiconductor memory or the like storage device for storing a control program therein. The CPU controls the pulse drive circuit 23 by executing the control program stored in the storage device. The control unit 22 detects that the collimator lens 12 has been located at the position of an origin, based on the detection signal from the sensor detection unit 21. Concretely, the control unit 22 detects the location of the collimator lens 12 at the position of the origin when the detection signal from the sensor detection unit 21 has become that value of the binary signal which indicates the insertion of the light shield plate 17 into the slot of the photointerrupter. The control unit 22 is connected with a host control system (not shown) and it performs the transmission/reception of information to/from the host control system.

The control unit 22 controls the pulse drive circuit 23 by a clock signal CLK, a polarity signal DIR and an enable signal EN. The pulse drive circuit 23 drives the stepping motor 11 by the four sorts of pulse drive voltages (hereinbelow, also referred to as "drive pulses") of outputs OUT1 to OUT4. The clock signal CLK is a reference signal which serves as the reference of the drive pulses OUT1 to OUT4, the polarity signal DIR is a signal which indicates the direction of moving the collimator lens 12, and the enable signal EN is a signal which allows the outputs of the drive pulses OUT1 to OUT4.

Figure 2:
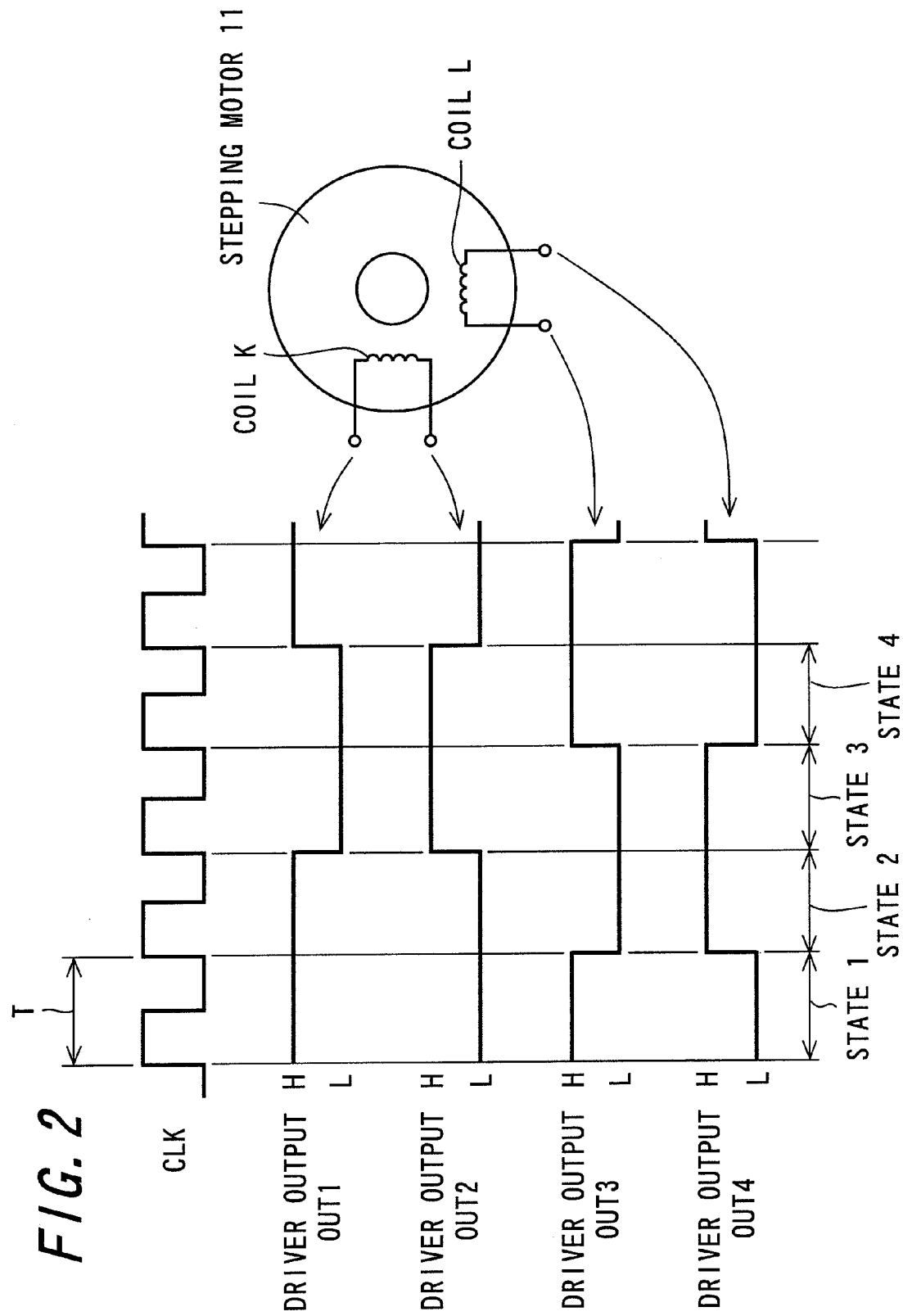
FIG. 2 is a diagram for explaining the drive pulses of a stepping motor.

FIG. 2 is a diagram for explaining the drive pulses of the stepping motor 11. The stepping motor 11 shown in FIG. 2 is a stepping motor of two-phase type, and it employs the two coils of a coil K and a coil L. The pulse drive circuit 23 outputs the four drive pulses OUT1 to OUT4 of different phases to the stepping motor 11.

The clock signal CLK is the reference signal of period T as is supplied from the control unit 22. The drive pulse (in FIG. 2, referred to as "driver output") OUT1 is a signal which is inputted to one end of the coil K, the drive pulse OUT2 is a signal which is inputted to the other end of the coil K, the drive pulse OUT3 is a signal which is inputted to one end of the coil L, and the drive pulse OUT4 is a signal which is inputted to the other end of the coil L.

In a state 1, voltages in a positive direction are applied to both the coil K and the coil L. In a state 2, the voltage in the positive direction is applied to the coil K, and a voltage in a negative direction is applied to the coil L. In a state 3, voltages in the negative direction are applied to both the coil K and the coil L. In a state 4, the voltage in the negative direction is applied to the coil K, and the voltage in the positive direction is applied to the coil L. Regarding the positive direction, in the coil K, the driver output OUT1 is at a HIGH level, and the driver output OUT2 is at a LOW level, and in the coil L, the driver output OUT3 is at the HIGH level, and the driver output OUT4 is at the LOW level. Regarding the negative direction, in the coil K, the driver output OUT1 is at the LOW level, and the driver output OUT2 is at the HIGH level, and in the coil L, the driver output OUT3 is at the LOW level, and the driver output OUT4 is at the HIGH level.

The pulse drive circuit 23 outputs the drive pulses to the stepping motor 11 while repeating the state 1, state 2, state 3 and state 4 in this order, thereby to move the collimator lens 12. Conversely, the drive pulses are outputted to the stepping motor 11 while repeating the state 4, state 3, state 2 and state 1 in this order, thereby to reverse the rotational direction of the stepping motor 11 and to move the collimator lens 12 in the opposite direction.

In the absence of step-out, the movement magnitude of the collimator lens 12 is proportional to the rotation magnitude of the stepping motor 11, so that the movement magnitude can be controlled by the number of clocks of the drive pulses of the clock signal CLK. The period of the drive pulse is quadruple the period of the clock signal CLK.

When the period (hereinbelow, also referred to as "pulse rate") T of the clock signal CLK is short, the stepping motor 11 is rotated at high speed, and the collimator lens 12 can be moved at high speed. However, when the pulse rate of the drive pulse is short, a drive torque is insufficient, and the step-out of the stepping motor 11 becomes liable to occur. When the stepping motor 11 has stepped out, the relationship between the number of clocks of the drive pulses and the movement magnitude of the collimator lens 12 becomes indefinite, and the position control of the collimator lens 12 becomes impossible.

The control unit 22 and the pulse drive circuit 23 constitute a movement speed variation unit. The sensor 16, the sensor detection unit 21, the control unit 22 and the pulse drive circuit 23 constitute a step-out detection unit. The sensor 16, the sensor detection unit 21 and the control unit 22 constitute a position detection unit.

Figure 3:
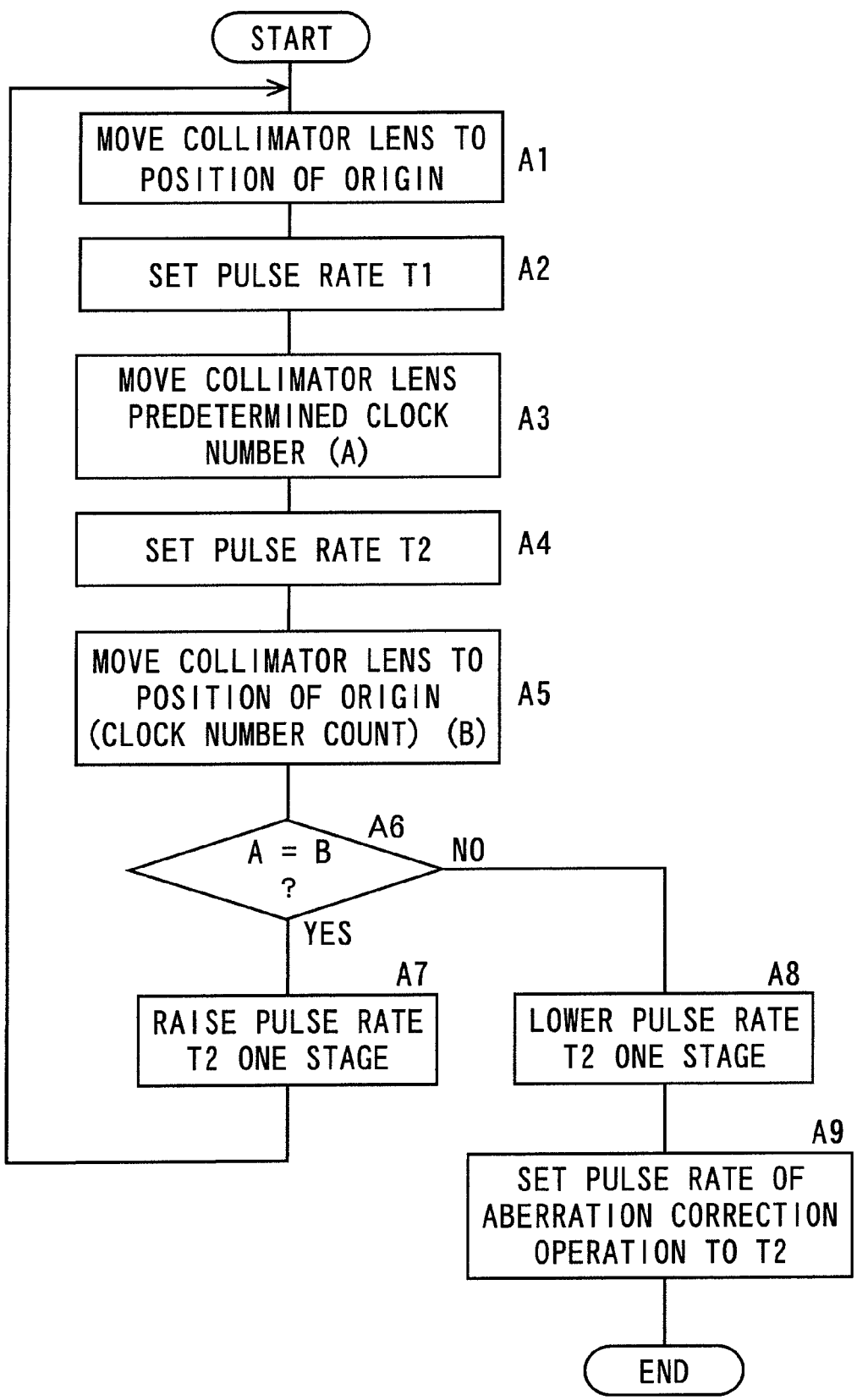
FIG. 3 is a flowchart showing an example of a movement speed determination process which a control unit executes.

FIG. 3 is a flowchart showing an example of a movement speed determination process which the control unit 22 executes. The movement speed determination process is a process for determining the pulse rate at the time when an operation for correcting the spherical aberration is performed. By way of example, when the optical disc is set and loaded on the optical pickup apparatus 1, the process proceeds to Step A1 before the reproduction or recording operation of the optical disc.

At Step A1, the collimator lens 12 is moved to the position of the origin. Concretely, the pulse drive circuit 23 is caused to drive the stepping motor 11 until the light shield plate 17 is inserted into the slot of the sensor 16 to intercept the light. At Step A2, the movement speed for moving the collimator lens 12 is determined. Concretely, the pulse rate which is specified to the stepping motor 11 is set to a predetermined value T1 with which the movement speed of the collimator lens 12 becomes a predetermined reference speed. The pulse rate T1 is a pulse rate of low speed, at which the stepping motor 11 does not step out even by a temperature fluctuation and a secular change, and which is, for example, 600 pps (pulses per second).

At Step A3, the stepping motor 11 is driven by the drive pulses which correspond to a predetermined clock number A, for example, a clock number of 100, and the collimator lens 12 is moved by a predetermined distance, for example, a distance corresponding to the 100 drive pulses. At Step A4, the pulse rate is set to a value T2. The pulse rate T2 at the first time is set to a pulse rate which is one stage higher than the pulse rate T1. Here, the expression "one stage" is, for example, 100 pps, and the pulse rate T2 at the first time becomes 700 pps. As the value of one stage is smaller, the optimum pulse rate, in other words, the optimum movement speed can be set more finely. However, as the value of one stage is smaller, a longer time is required for the operation of determining the movement speed. As the value of one stage, therefore, a value which is appropriate for each individual optical pickup apparatus 1 is selected.

At Step A5, the collimator lens 12 is moved to the position of the origin. On this occasion, the clock number B of the drive pulses required for the movement is counted. At Step A6, whether or not the clock numbers A and B are equal is checked. If the clock numbers A and B are equal, it is judged that the stepping motor 11 has not stepped out due to the drive by the pulse rate T2, and the process proceeds to Step A7. On the other hand, if the clocks A and B are not equal, it is judged that the stepping motor 11 has stepped out due to the drive by the pulse rate T2, and the process proceeds to Step A8.

At Step A7, the pulse rate T2 is raised one stage, that is, a pulse rate which is still one stage higher is set. Thereafter, the process is returned to Step A1, and Steps A1 to A6 are repeated. At Step A8, the pulse rate T2 is lowered by one stage. At Step A9, the pulse rate of the operation of correction of spherical aberration is determined to and set to the pulse rate T2, whereupon the movement speed determination process is ended.

Steps A1 to A7 constitute the operation of detecting the step-out of the stepping motor 11, and Steps A8 and A9 constitute the operation of setting the movement speed of the stepping motor 11 in the case of making the ordinary spherical aberration correction.

Since the pulse rate T1 set at Step A3 is the pulse rate for driving the stepping motor 11 at the low speed, the collimator lens 12 can be moved in correspondence with, for example, 100 pulses by the drive corresponding to the 100 pulses without the occurrence of the step-out of the stepping motor 11. However, when the step-out has occurred due to the pulse rate T2 set at Step A5, the collimator lens 12 does not arrive at the position of the origin, that is, the position detected by the sensor 16, by the drive corresponding to the 100 pulses. In other words, a count clock number at the time of the arrival at the position of the origin exceeds the 100 pulses, and hence, the magnitude of the step-out can be detected in terms of the difference between the clock numbers A and B.

In this manner, the drive control apparatus according to the invention can detect the presence or absence of the step-out merely by employing the simple sensor 16 or a switch which requires only the binary detection, without employing a decoder which detects an actual address located by the rotation of the stepping motor 11, a sensor which operates over the whole movement range of the collimator lens 12, or the like.

Further, the movement speed at which the collimator lens 12 is moved by the stepping motor 11 can be set to the highest speed within a range in which the step-out does not occur. Here, when the pulse rate T2 is set by being lowered, for example, two stages, at Step A8, an immunity against the step-out increases more.

The operation of determining the movement speed of the stepping motor 11 is performed before the reproduction or recording of the optical disc or at the time of the change of an operating ambient temperature when the power source of an optical disc apparatus in which the optical pickup apparatus 1 is installed has been turned on. The stepping motor 11 can be always driven at the optimum pulse rate by determining the movement speed in this manner, so that a stable and fast spherical aberration correction can be realized.

Figure 4:
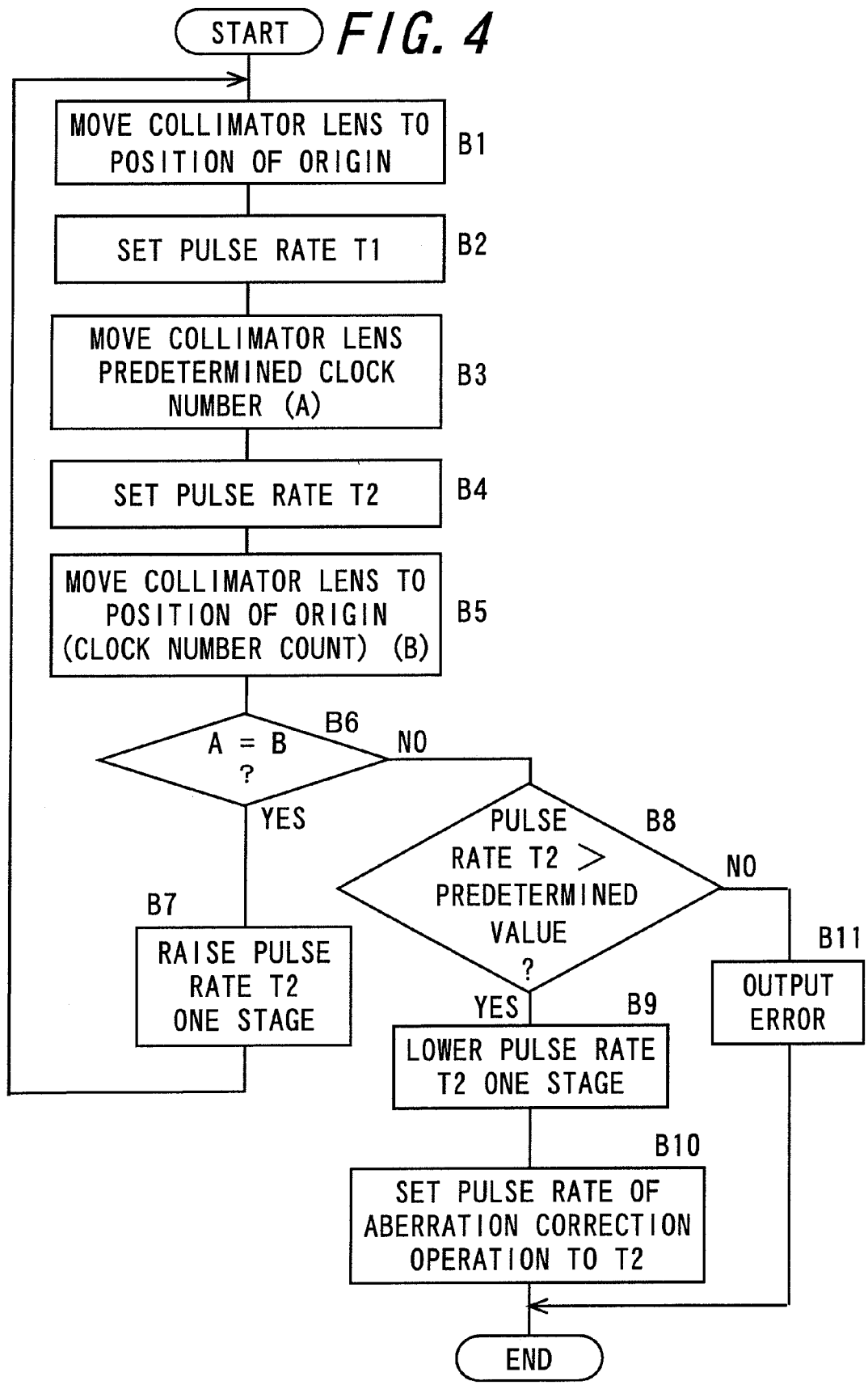
FIG. 4 is a flowchart showing another example of the movement speed determination process which the control unit executes.

FIG. 4 is a flowchart showing another example of the movement speed determination process which the control unit 22 executes. The movement speed determination process shown in FIG. 4 is the example in which the step of delivering an error output when the pulse rate at the step-out is small is added to the movement speed determination process shown in FIG. 3. By way of example, when the optical disc is set and loaded on the optical pickup apparatus 1, the determination process proceeds to Step B1 before the reproduction or recording operation of the optical disc. Steps B1 to B7 and Steps B9 and B10 are the same steps as Steps A1 to A9 shown in FIG. 3, respectively, and they shall not be repeatedly described.

At Step B8, whether or not the pulse rate T2 is larger than a predetermined pulse rate is decided. When the pulse rate T2 is not larger than the predetermined pulse rate, the process proceeds to Step B11, and when the pulse rate T2 is larger than the predetermined pulse rate, the process proceeds to Step B9. At Step B11, an error is outputted, whereupon the movement speed determination process is ended. That is, in a case where step-out occurs at a pulse rate equal to or smaller than the predetermined pulse rate, it is judged that an abnormality has been detected, and the movement speed determination process is ended by outputting the error.

The predetermined pulse rate which is a predetermined error speed, is a pulse rate of low speed which forms an obstacle to the operation of correction of spherical aberration. The error output is performed in such a way that the control unit 22 transmits error information indicating the abnormality, to the host control system, and that the host control system outputs the received error information. The optical pickup apparatus 1 can prompt the user of the optical disc apparatus to improve or repair a service environment, by outputting the error information to the host control system.

Step A2 or A4 shown in FIG. 3 or Step B2 or B4 shown in FIG. 4 is the movement speed variation step, Step A3 shown in FIG. 3 or Step B3 shown in FIG. 4 is the first count step, Step A5 shown in FIG. 3 or Step B5 shown in FIG. 4 is the second count step, Step A6 shown in FIG. 3 or Step B6 shown in FIG. 4 is the step-out detection step, and Step A9 shown in FIG. 3 or Step B10 shown in FIG. 4 is the determination step.

In this manner, the movement speed is changed and is specified to the stepping motor 11 by which the lead screw 13 and the nut member 14 for moving the collimator lens 12 are driven at the specified movement speed, by the control unit 22 and the pulse drive circuit 23. Besides, the movement speed at which the stepping motor 11 has stepped out is detected from among the movement speeds specified to the stepping motor 11 by the control unit 22 and the pulse drive circuit 23, by the sensor 16, the sensor detection unit 21, the control unit 22 and the pulse drive circuit 23. Further, the movement speed for correction of spherical aberration based on the movement of the collimator lens 12 is determined based on the movement speed detected by the sensor 16, the sensor detection unit 21, the control unit 22 and the pulse drive circuit 23, by the control unit 22.

That is, the movement speed at which the stepping motor 11 steps out is detected beforehand without employing a piezoelectric element and the decoder which are expensive, and the movement speed at which the stepping motor 11 does not step out can be determined based on the detected movement speed. Accordingly, the step-out of the stepping motor 11 can be avoided in correction of spherical aberration with a small size and at a low price.

Further, the predetermined reference speeds, concretely, the pulse rate Ti and at least one movement speed different from the pulse rate T1, concretely, the pulse rate T2 are specified to the stepping motor 11, by the control unit 22 and the pulse drive circuit 23. Therefore, the pulse rate T2 at which the stepping motor 11 steps out can be detected by increasing the pulse rate T2 gradually from the pulse rate T1 at which the step-out does not occur, and it can be precisely detected.

Further, when step-out has been detected at a pulse rate which is equal to or lower than a predetermined pulse rate, by the sensor 16, the sensor detection unit 21, the control unit 22 and the pulse drive circuit 23, there is outputted error information indicating that the stepping motor 11 is abnormal. That is, the stepping motor 11 steps out even at the low pulse rate, so that the abnormality can be reported to the user by outputting the error information.

Further, in controlling the stepping motor 11 by which the lead screw 13 and the nut member 14 that move the collimator lens 12 are driven at a specified movement speed, the movement speed is changed and is specified to the stepping motor 11 at Steps A2 and A4 shown in FIG. 3 or Steps B2 and B4 shown in FIG. 4. At Step A6 shown in FIG. 3 or Step B6 shown in FIG. 4, the movement speed at which the stepping motor 11 has stepped out is detected from among the movement speeds specified to the stepping motor 11 at Steps A2 and A4 shown in FIG. 3 or Steps B2 and B4 shown in FIG. 4. In addition, at Step A9 shown in FIG. 3 or Step B10 shown in FIG. 4, the movement speed for correction of spherical aberration based on the movement of the collimator lens 12 is determined based on the movement speed detected at Step A6 shown in FIG. 3 or Step B6 shown in FIG. 4.

That is, the movement speed at which the stepping motor 11 steps out is detected beforehand without employing the piezoelectric element and the decoder which are expensive, and the movement speed at which the stepping motor 11 does not step out can be determined based on the detected movement speed. Accordingly, when the drive control method according to the invention is applied, the step-out of the stepping motor 11 can be avoided in correction of spherical aberration with a small size and at a low price.

Further, the stepping motor 11 drives the lead screw 13 and the nut member 14 in accordance with the specified drive pulses, and the predetermined reference speeds, concretely, the pulse rate T1 and at least one movement speed different from the pulse rate T1, concretely, the pulse rate T2 are specified to the stepping motor 11, at Steps A2 and A4 shown in FIG. 3 or Steps B2 and B4 shown in FIG. 4. At Step A3 shown in FIG. 3 or Step B3 shown in FIG. 4, when the collimator lens 12 has moved a predetermined distance, for example, a distance corresponding to 100 drive pulses, at the pulse rate T1 specified, the pulse number of the drive pulses specified to the stepping motor 11 is counted. At Step A5 shown in FIG. 3 or Step B5 shown in FIG. 4, when the collimator lens 12 has been moved the predetermined distance at, at least, one pulse rate T2 different from the pulse rate T1 specified, the pulse number of the drive pulses specified to the stepping motor 11 is counted. In addition, at Step A6 shown in FIG. 3 or Step B6 shown in FIG. 4, the step-out is detected based on the difference between the pulse number counted at Step A3 shown in FIG. 3 or Step B3 shown in FIG. 4 and the pulse number counted at Step A5 shown in FIG. 3 or Step B5 shown in FIG. 4. Therefore, the pulse rate T2 at which the stepping motor 11 does not step out can be determined merely by counting the pulse numbers.

Figure 5:
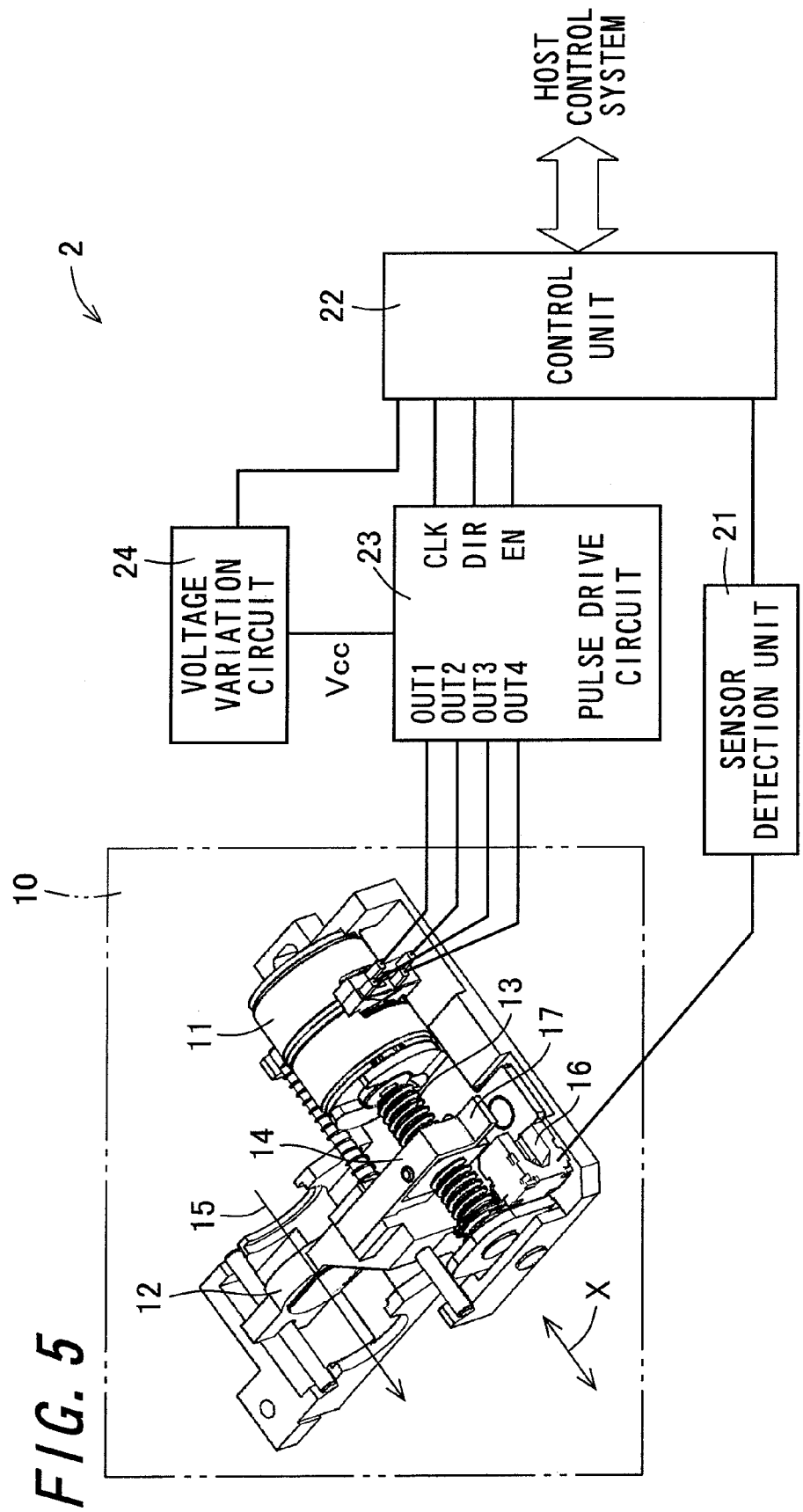
FIG. 5 is a block diagram schematically showing part of the configuration of an optical pickup apparatus according to another embodiment of the invention.

FIG. 5 is a block diagram schematically showing part of the configuration of an optical pickup apparatus 2 according to another embodiment of the invention. The optical pickup apparatus 2 includes an optical pickup drive device 10, a sensor detection unit 21, a control unit 22, a pulse drive circuit 23 and a voltage variation circuit 24. The same constituent elements as those of the optical pickup apparatus 1 shown in FIG. 1 are respectively designated by the same reference numerals and signs, and they shall be omitted from repeated description.

The voltage variation circuit 24 applies a supply voltage Vcc to the pulse drive circuit 23. This voltage variation circuit 24 changes the supply voltage Vcc to-be-applied in accordance with an instruction from the control unit 22, thereby to control the voltage (hereinbelow, also referred to as "crest value") of drive pulses which the pulse drive circuit 23 outputs. The crest value is substantially the same voltage as the supply voltage Vcc, and it is a voltage which is lower in correspondence with a voltage drop in the voltage variation circuit 24, for example, 0.1 V. Hereinbelow, the supply voltage shall be also referred to as "drive voltage". When the drive voltage is low, electric power required for driving a stepping motor 11 may be little, but the step-out of the stepping motor 11 becomes liable to occur due to an insufficient drive torque. When the stepping motor 11 has stepped out, the relationship of the rotation magnitude of the stepping motor 11 with the movement magnitude of a collimator lens 12 becomes indefinite, and the position control of the collimator lens 12 becomes impossible.

The control unit 22, the pulse drive circuit 23 and the voltage variation circuit 24 constitute a drive voltage variation unit. Besides, a sensor 16, the sensor detection unit 21, the control unit 22, the pulse drive circuit 23 and the voltage variation circuit 24 constitute a step-out detection unit. Further, the control unit 22 constitutes a determination unit. In addition, the sensor 16, the sensor detection unit 21 and the control unit 22 constitute a position detection unit.

Figure 6:
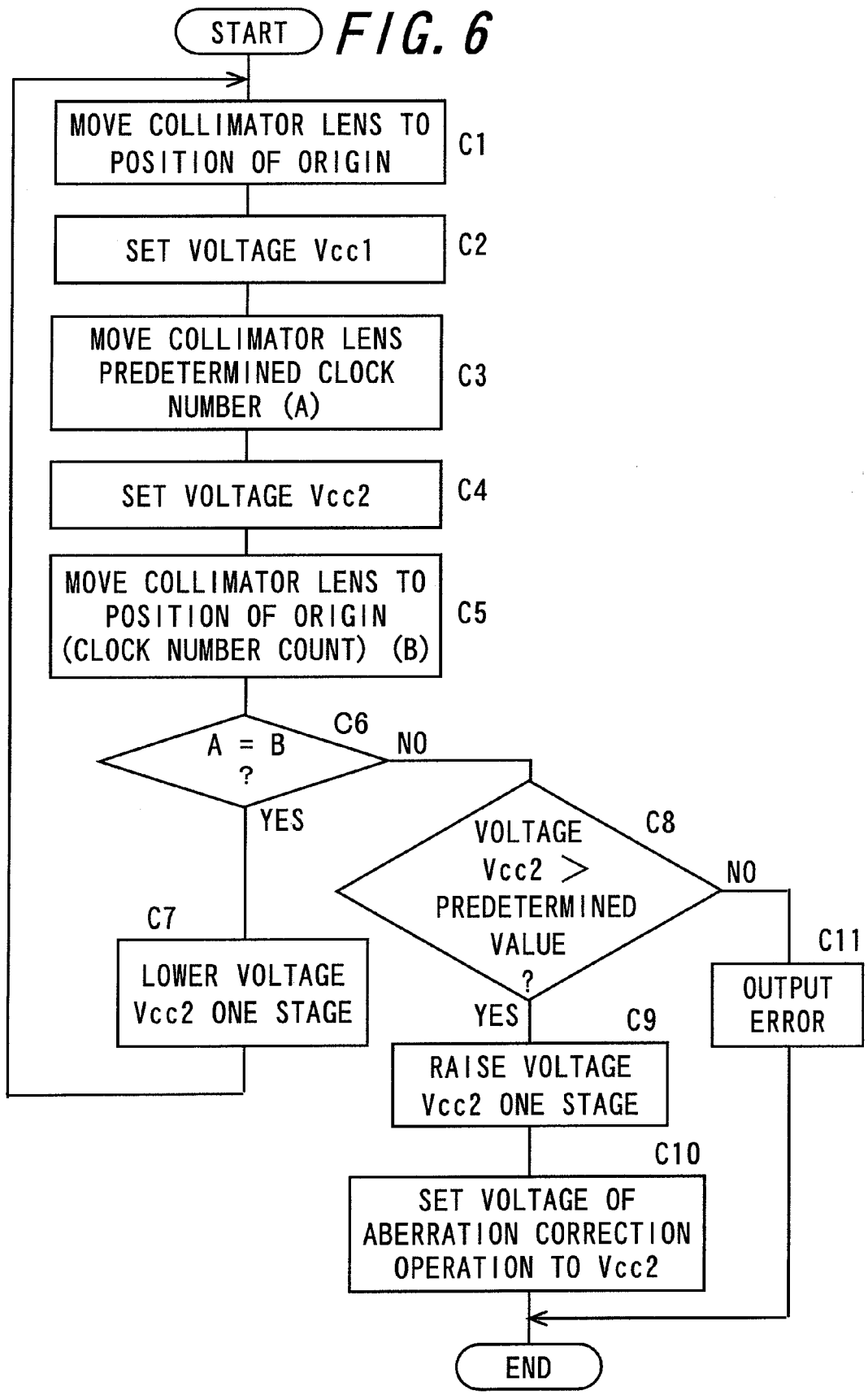
FIG. 6 is a flowchart showing an example of a drive voltage determination process which the control unit executes.

FIG. 6 is a flowchart showing an example of a drive voltage determination process which the control unit 22 executes. The drive voltage determination process is a process for determining the drive voltage at the time when an operation for correcting a spherical aberration is performed. By way of example, when an optical disc is set and loaded on the optical pickup apparatus 2, the process proceeds to Step C1 before the reproduction or recording operation of the optical disc.

At Step C1, the collimator lens 12 is moved to the position of the origin. Concretely, the pulse drive circuit 23 is caused to drive the stepping motor 11 until a light shield plate 17 is inserted into the slot of the sensor 16 to intercept light. At Step C2, the drive voltage of the stepping motor 11 is set to a predetermined value Vcc1 which is a predetermined reference voltage. The drive voltage Vcc1 is a high voltage, for example, a voltage of 5 V (volts), at which the stepping motor 11 does not step out even in case of a temperature fluctuation or a secular change.

At Step C3, the stepping motor 11 is driven by the drive pulses which correspond to a predetermined clock number A, for example, a clock number of 100, and the collimator lens 12 is moved a predetermined distance, for example, a distance corresponding to the 100 drive pulses. At Step C4, the drive voltage is set to a value Vcc2. The drive voltage Vcc2 at the first time is set to a voltage which is one stage lower than the drive voltage Vcc1. Here, the expression "one stage" is, for example, 0.1 V, and the drive voltage Vcc2 at the first time becomes 4.9 V. As the value of one stage is smaller, the optimum drive voltage can be set more finely. However, as the value of one stage is smaller, a longer time is required for the operation of determining the drive voltage. As the value of one stage, therefore, a value which is appropriate for each individual optical pickup apparatus 2 is selected.

At Step C5, the collimator lens 12 is moved to the position of the origin. On this occasion, the clock number B of the drive pulses required for the movement is counted. At Step C6, whether or not the clock numbers A and B are equal is checked. If the clock numbers A and B are equal, it is judged that the stepping motor 11 has not stepped out due to the drive by the drive voltage Vcc2, and the process proceeds to Step C7. On the other hand, if the clock numbers A and B are not equal, it is judged that the stepping motor 11 has stepped out due to the drive by the drive voltage Vcc2, and the process proceeds to Step C8.

At Step C7, the drive voltage Vcc2 is lowered by one stage, that is, a voltage which is still one stage lower is set. Thereafter, the process is returned to Step C1, and Steps C1 to C6 are repeated. At Step C8, whether or not the drive voltage Vcc2 is smaller than a predetermined drive voltage which is a predetermined error voltage is decided. When the drive voltage Vcc2 is smaller than the predetermined drive voltage, the process proceeds to Step C9, and when the drive voltage Vcc2 is not smaller than the predetermined drive voltage, the process proceeds to Step C11.

At Step C9, the drive voltage Vcc2 is raised one stage. At Step C10, the drive voltage of operation for correction of spherical aberration is determined to and set to the voltage Vcc2, whereupon the drive voltage determination process is ended. At Step C11, an error is outputted, whereupon the drive voltage determination process is ended. That is, in a case where step-out occurs at a drive voltage equal to or higher than the predetermined drive voltage, it is judged that an abnormality has been detected, and the drive voltage determination process is ended by outputting the error.

Steps C1 to C7 constitute the operation of detecting the step-out of the stepping motor 11, and Steps C9 and C10 constitute the operation of setting the drive voltage of the stepping motor 11 in the case of making the ordinary spherical aberration correction.

Since the drive voltage Vcc1 set at Step C3 is the drive voltage for driving the stepping motor 11 at the high voltage, the collimator lens 12 can be moved in correspondence with, for example, 100 pulses by the drive corresponding to the 100 pulses without the occurrence of the step-out of the stepping motor 11. However, when the step-out has occurred due to the drive voltage Vcc2 set at Step C5, the collimator lens 12 does not arrive at the position of the origin, that is, the position detected by the sensor 16, by the drive corresponding to the 100 pulses. In other words, a count clock number at the time of the arrival at the position of the origin exceeds the 100 pulses, and hence, the magnitude of the step-out can be detected in terms of the difference between the clock numbers A and B.

In this manner, the drive control apparatus according to the invention can detect the presence or absence of the step-out merely by employing the simple sensor 16 or a switch which requires only the binary detection, without employing a decoder which detects an actual address located by the rotation of the stepping motor 11, a sensor which operates over the whole movement range of the collimator lens 12, or the like.

Further, the voltage of the drive pulses which are outputted to the stepping motor 11 for moving the collimator lens 12 can be set to the voltage of the lowest power consumption within a range in which the step-out does not occur. Here, when the drive voltage Vcc2 is set by being raised, for example, two stages, at Step C9, an immunity against the step-out increases more.

Step C2 or C4 shown in FIG. 6 is the movement speed variation step, Step C3 shown in FIG. 6 is the first count step, Step C5 shown in FIG. 6 is the second count step, Step C6 shown in FIG. 6 is the step-out detection step, and Step C10 shown in FIG. 6 is the determination step.

The predetermined pulse rate for detecting the abnormality as shown in FIG. 4, or the predetermined drive voltage for detecting the abnormality as shown in FIG. 6 differs depending upon the stepping motor or optical design which is used. In case of, for example, the operation of jumping between layers in the two-layer disc of a Blu-ray disc, spherical aberrations existing in the individual layers need to be corrected in a short time of or less than several tens milliseconds. In order to attain the operation in the short time of or less than several tens milliseconds, the values of lower limits are, for example, about 1000 pps as the pulse rate, and about 3 V as the drive voltage.

In this manner, the drive voltage is changed and is specified to the stepping motor 11 by which a lead screw 13 and a nut member 14 for moving the collimator lens 12 are driven by a drive torque corresponding to the drive voltage specified, by the control unit 22, the pulse drive circuit 23 and the voltage variation circuit 24. Besides, the drive voltage at which the stepping motor 11 has stepped out is detected from among the drive voltages specified to the stepping motor 11 by the control unit 22, the pulse drive circuit 23 and the voltage variation circuit 24, by the sensor 16, the sensor detection unit 21, the control unit 22, the pulse drive circuit 23 and the voltage variation circuit 24. Further, the drive voltage for correction of spherical aberration based on the movement of the collimator lens 12 is determined based on the drive voltage detected by the sensor 16, the sensor detection unit 21, the control unit 22, the pulse drive circuit 23 and the voltage variation circuit 24, by the control unit 22.

That is, the drive voltage at which the stepping motor 11 steps out is detected beforehand without employing a piezoelectric element and a decoder which are expensive, and the drive voltage at which the stepping motor 11 does not step out can be determined based on the detected drive voltage. Accordingly, the step-out of the stepping motor 11 can be avoided in correction of spherical aberration with a small size and at a low price.

Further, the predetermined reference voltages, concretely, the drive voltage Vcc1 and at least one drive voltage different from the drive voltage Vcc1, concretely, the drive voltage Vcc2 are specified to the stepping motor 11, by the control unit 22, the pulse drive circuit 23 and the voltage variation circuit 24. Therefore, the drive voltage Vcc2 at which the stepping motor 11 steps out can be detected by lowering the drive voltage Vcc2 gradually from the drive voltage Vcc1 at which the step-out does not occur, and it can be precisely detected.

Further, when step-out has been detected at the drive voltage Vcc2 which is equal to or higher than a predetermined drive voltage, by the sensor 16, the sensor detection unit 21, the control unit 22, the pulse drive circuit 23 and the drive variation circuit 24, there is outputted error information indicating that the stepping motor 11 is abnormal. That is, the stepping motor 11 steps out even at the high drive voltage, so that the abnormality can be reported to the user by outputting the error information.

Further, in controlling the stepping motor 11 by which the lead screw 13 and the nut member 14 that move the collimator lens 12 are driven by a drive torque corresponding to the specified, the drive voltage is changed and is specified to the stepping motor 11 at Steps C2 and C4 shown in FIG. 6. At Step C6 shown in FIG. 6, the drive voltage at which the stepping motor 11 has stepped out is detected from among the drive voltages specified to the stepping motor 11 at Steps C2 and C4 shown in FIG. 6. In addition, at Step C10 shown in FIG. 6, the drive voltage for correction of spherical aberration based on the movement of the collimator lens 12 is determined based on the drive voltage detected at Step C6 shown in FIG. 6.

That is, the drive voltage at which the stepping motor 11 steps out is detected beforehand without employing the piezoelectric element and the decoder which are expensive, and the drive voltage at which the stepping motor 11 does not step out can be determined based on the detected drive voltage. Accordingly, when the drive control method according to the invention is applied, the step-out of the stepping motor 11 can be avoided in correction of spherical aberration with a small size and at a low price.

Further, the stepping motor 11 drives the lead screw 13 and the nut member 14 in accordance with the specified drive pulses, and the predetermined reference voltages, concretely, the drive voltage Vcc1 and at least one drive voltage different from the drive voltage Vcc1, concretely, the drive voltage Vcc2 are specified to the stepping motor 11, at Steps C2 and C4 shown in FIG. 6. At Step C3 shown in FIG. 6, when the collimator lens 12 has moved a predetermined distance, for example, a distance corresponding to 100 drive pulses, at the specified drive voltage Vcc1, the pulse number of the drive pulses specified to the stepping motor 11 is counted. At Step C5 shown in FIG. 6, when the collimator lens 12 has moved the predetermined distance at, at least, one drive voltage Vcc2 different from the specified drive voltage Vcc1, the pulse number of the drive pulses specified to the stepping motor 11 is counted. In addition, at Step C6 shown in FIG. 6, the step-out is detected based on the difference between the pulse number counted at Step C3 shown in FIG. 6 and the pulse number counted at Step C5 shown in FIG. 6. Therefore, the drive voltage at which the stepping motor 11 does not step out can be determined merely by counting the pulse numbers.

Further, the lead screw 13 and the nut member 14 are driven in accordance with the drive pulses specified, by the stepping motor 11, and the collimator lens 12 is moved the predetermined distance by the sensor 16, the sensor detection unit 21, the control unit 22 and the pulse drive circuit 23, or by the sensor 16, the sensor detection unit 21, the control unit 22, the pulse drive circuit 23 and the voltage variation circuit 24. Thereby, the step-out can be detected by counting the pulse number of the drive pulses specified to the stepping motor 11. Therefore, the step-out can be detected merely by counting the pulse number.

Further, the position of the collimator lens 12 is detected by the sensor 16, the sensor detection unit 21 and the control unit 22, and the pulse number is counted with reference to the position detected by the sensor 16, the sensor detection unit 21 and the control unit 22, by the sensor 16, the sensor detection unit 21, the control unit 22 and the pulse drive circuit 23 or by the sensor 16, the sensor detection unit 21, the control unit 22, the pulse drive circuit 23 and the voltage variation circuit 24. Therefore, the pulse number can be counted in terms of a distance from the reference position.

Further, the optical pickup apparatus 2 includes the drive control apparatus, so that the step-out of the stepping motor 11 can be avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A drive control apparatus comprising:
    a drive portion which drives a movement mechanism for moving an optical component for correction of spherical aberration, at a specified speed;
    a movement speed variation unit for specifying varied movement speeds for the drive portion at a predetermined time prior to the correction of spherical aberration, the movement speed being varied until the drive portion steps out;
    a step-out detection unit for detecting a movement speed at which the drive portion has stepped out, from among the varied movement speeds specified to the drive portion by the movement speed variation unit; and
    a determination unit for determining a movement speed for the correction of spherical aberration due to movement of the optical component, based on the movement speed detected by the step-out detection unit.

2. The drive control apparatus of claim 1, wherein the movement speed variation unit specifies a predetermined reference speed and at least one movement speed different from the predetermined reference speed, to the drive portion.

3. The drive control apparatus of claim 1, wherein the drive portion drives the movement mechanism in accordance with the drive pulses specified, and
    the step-out detection unit detects the step-out by counting the pulse number of the drive pulses specified to the drive portion in order to move the optical component a predetermined distance.

4. The drive control apparatus of claim 3, wherein the step-out detection unit includes a position detection unit for detecting a position of the optical component, and the pulse number is counted with reference to the position detected by the position detection unit.

5. The drive control apparatus of claim 1, wherein, when the step-out detection unit has detected the step-out at the movement speed which is a predetermined error speed or less, the step-out detection unit outputs error information which indicates that the drive portion is abnormal.

6. A drive control apparatus comprising:
    a drive portion which drives a movement mechanism for moving an optical component for correction of spherical aberration, at a drive torque according to a specified drive voltage;
    a drive voltage variation unit for specifying varied drive voltages for the drive portion at a predetermined time prior to the correction of spherical aberration, the drive voltage being carried until the drive portion steps out;
    a step-out detection unit for detecting a drive voltage at which the drive portion has stepped out, from among the varied drive voltages specified to the drive portion by the drive voltage variation unit; and
    a determination unit for determining a drive voltage for the correction of spherical aberration due to movement of the optical component, based on the drive voltage detected by the step-out detection unit.

7. The drive control apparatus of claim 6, wherein the drive voltage variation unit specifies a predetermined reference voltage and at least one drive voltage different from the predetermined reference voltage, to the drive portion.

8. The drive control apparatus of claim 6, wherein the drive portion drives the movement mechanism in accordance with the drive pulses specified, and
    the step-out detection unit detects the step-out by counting the pulse number of the drive pulses specified to the drive portion in order to move the optical component a predetermined distance.

9. The drive control apparatus of claim 8, wherein the step-out detection unit includes a position detection unit for detecting a position of the optical component, and the pulse number is counted with reference to the position detected by the position detection unit.

10. The drive control apparatus of claim 6, wherein, when the step-out detection unit has detected the step-out at the drive voltage which is a predetermined error voltage or more, the step-out detection unit outputs error information which indicates that the drive portion is abnormal.

11. A drive control method of controlling a drive portion that drives a movement mechanism for moving an optical component for correction of spherical aberration, at a movement speed specified, comprising:
    a movement speed variation step of specifying varied movement speeds for the drive portion at a predetermined time prior to the correction of spherical aberration, the movement speed being varied until the drive portion steps out;
    a step-out detection step of detecting a movement speed at which the drive portion has stepped out, from among varied movement speeds specified to the drive portion at the movement speed variation step; and
    a determination step of determining a movement speed for the correction of spherical aberration due to movement of the optical component, based on the movement speed detected at the step-out detection step.

12. The drive control method of claim 11, wherein:
the drive portion drives the movement mechanism in accordance with drive pulses specified; and
a predetermined reference speed and at least one movement speed different from the predetermined reference speed are specified to the drive portion, at the movement speed variation step,
the method further comprising:
a first counting step of counting the pulse number of the drive pulses specified to the drive portion, when the optical component has moved a predetermined distance at the reference speed specified; and
a second counting step of counting the pulse number of the drive pulses specified to the drive portion, when the optical component has moved a predetermined distance at, at least one movement speed different from the reference speed specified,
wherein the step-out is detected based on a difference between the pulse number counted at the first counting step and the pulse number counted at the second counting step, at the step-out detection step.

13. A drive control method of controlling a drive portion that drives a movement mechanism for moving an optical component for correction of spherical aberration, by a drive torque corresponding to a specified drive voltage, comprising:
a drive voltage variation step of specifying varied drive voltages to the drive portion at a predetermined time prior to the correction of spherical aberration, the drive voltage being varied until the drive portion steps out;
a step-out detection step of detecting a drive voltage at which the drive portion has stepped out, from among the varied drive voltages specified to the drive portion at the drive voltage variation step; and
a determination step of determining a drive voltage for the correction of spherical aberration due to movement of the optical component, based on the drive voltage detected at the step-out detection step.

14. The drive control method of claim 13, wherein:
the drive portion drives the movement mechanism in accordance with the drive pulses specified; and
a predetermined reference voltage and at least one drive voltage different from the predetermined reference voltage are specified to the drive portion, at the drive voltage variation step,
the method further comprising:
a first counting step of counting the pulse number of the drive pulses specified to the drive portion, when the optical component has moved a predetermined distance at the reference voltage specified; and
a second counting step of counting the pulse number of the drive pulses specified to the drive portion, when the optical component has moved a predetermined distance at, at least one drive voltage different from the reference voltage specified,
wherein the step-out is detected based on a difference between the pulse number counted at the first counting step and the pulse number counted at the second counting step, at the step-out detection step.

15. An optical pickup apparatus comprising the drive control apparatus of claim 1.

16. An optical pickup apparatus comprising the drive control apparatus of claim 6.

* * * * *